United States Patent [19]

Sharpe

[11] 4,281,559
[45] Aug. 4, 1981

[54] VARIABLE SPEED TRANSMISSION SYSTEMS

[75] Inventor: Raymond Sharpe, Mirfield, England

[73] Assignee: Lucas Industries Limited, Birmingham, England

[21] Appl. No.: 73,230

[22] Filed: Sep. 7, 1979

Related U.S. Application Data

[63] Continuation of Ser. No. 824,247, Aug. 12, 1977.

[30] Foreign Application Priority Data

Aug. 14, 1976 [GB] United Kingdom ............... 33904/76

[51] Int. Cl.³ .......................................... F16H 15/08
[52] U.S. Cl. .................................................... 74/200
[58] Field of Search ............. 74/200, 198, 199, 190.5, 74/196, 190

[56] References Cited

U.S. PATENT DOCUMENTS

| 3,410,146 | 11/1968 | Nordeen | 74/200 |
|---|---|---|---|
| 3,413,864 | 12/1968 | Magill | 74/200 |
| 3,430,504 | 3/1969 | Dickenbrock | 74/200 |
| 3,455,177 | 7/1969 | Schofield | 74/200 |
| 3,802,284 | 4/1974 | Sharpe | 74/200 |
| 3,823,613 | 7/1974 | Abbott | 74/200 |
| 3,826,147 | 7/1974 | Sharpe | 74/200 |
| 3,826,148 | 7/1974 | Magill | 74/200 |
| 3,828,618 | 8/1974 | Sharpe | 74/200 |

FOREIGN PATENT DOCUMENTS

| 2236589 | 2/1973 | Fed. Rep. of Germany | 74/200 |
|---|---|---|---|
| 23748 | 2/1904 | Sweden | 74/200 |
| 1146324 | 3/1969 | United Kingdom | 74/198 |
| 1395319 | 5/1975 | United Kingdom | 74/200 |

Primary Examiner—Samuel Scott
Assistant Examiner—G. Anderson
Attorney, Agent, or Firm—Kane, Dalsimer, Kane, Sullivan and Kurucz

[57] ABSTRACT

A transmission system including two axially spaced torus discs or rotors, one serving as an input and the other as an output and between which there is a set of circumferentially spaced drive rollers in frictional rolling contact with part toroidal surfaces on the discs, each roller being mounted in a bearing structure which can tilt about an axis at right angles to the axis of rotation of each roller to vary the distances from the gear axis at which the roller engages the two discs respectively to vary the ratio of the gear, means being provided for moving each roller bearing structure generally tangentially of the gear axis, and arranged to apply a force to said structure in a direction non-parallel with respect to the plane which is perpendicular to the gear axis and there being means for accommodating the effective movement of the roller bearing axes relatively to the gear axis in a direction parallel to the gear axis.

6 Claims, 4 Drawing Figures

FIG. I.

VARIABLE SPEED TRANSMISSION SYSTEMS

This is a continuation of application Ser. No. 824,247, filed Aug. 12, 1977.

BACKGROUND AND SUMMARY OF THE INVENTION

This invention relates to variable ratio frictional drive gears of the kind comprising basically two axially spaced torus discs or rotors, one serving as an input and the other an output, between which there is a set of circumferentially spaced drive rollers in frictional rolling contact with part toroidal surfaces on the discs, each roller being rotatably mounted in a bearing structure which can tilt about an axis at right angles to the axis of rotation of each roller so as to vary the distances from the gear axis at which the roller engages the two discs respectively, thus varying the drive ratio of the gear. The angle of tilt of the roller bearing structure as it controls the drive ratio of the gear, is called the ratio angle.

One way of changing the ratio angle is to provide means to apply a force to each of the roller bearing structures to move it generally tangentially with respect to the gear axis, and by allowing the rollers then to steer themselves towards a different ratio angle. The rollers are each mounted in their bearing structures in such a way that they are inclined at an angle to a plane perpendicular to the gear axis. This angle is called the caster angle. Gears of this general construction are referred to as gears with tangentially controlled roller bearing structures. Such a drive gear will for convenience herein be described as being of the kind specified.

This invention is particularly, though not exclusively, concerned with gears in which the plane of each roller, normal to the axis of rotation of the roller and passing through the points of contact of the roller with the two opposed torus discs, contains the axis about which the roller tilts, being tangential to the torus centre circle (i.e. the locus of the centre of the circle revolved to generate the torus) as distinct from gears in which the same plane for each roller is closer to the main axis of rotation of the gear.

The input must rotate in the direction in which it tends to drag each roller against the control force which controls the tangential position of the rollers. The caster angle must be such that each roller tilt axis is inclined away from the input disc in the direction of movement of the disc. This criterion arises out of the fact that stable operation at any given ratio angle occurs when the axis of rotation of each roller passes through the gear axis. Unless the caster angle is as just described, tangential displacement of a roller (by virtue of an increase or decrease in the load on the gear or in controlling fluid pressure) will result in the torus discs producing a steering force on the roller which will tilt the roller in the direction opposite to that which is required to move the roller axis back to intersect the gear axis, so that the roller will be moved away from, instead of towards, its new stable position.

In general, the larger the caster angle, the more stably the rollers tend to maintain their ratio angles and consequently the more reliably the apparatus operates. This is of particular importance when the apparatus is run at very high rotational speeds, perhaps up to 20,000 revolutions per minute, though there are operating conditions in which maximising the caster angle is not so important.

There have, in the past, been many attempts to achieve ease of adjustment of the rollers with reliable operation of the apparatus, that is with minimum wear and maximum power transmission from the input to the output, and while many of them are satisfactory, most have some short comings, being, particularly, not well suited for all operating conditions, though good in some.

It is the object of this invention to provide a transmission system of the kind specified in which the efficiency is maximised for a wide range of operating conditions.

According to the invention there is provided a transmission system of the kind specified wherein the means for moving each of the roller bearing structures generally tangentially of the gear axis is arranged to apply a force to said structure, said force being in a direction non-parallel with respect to the plane which is perpendicular to the gear axis, there being means for accommodating effective movement of the roller bearing axes relatively to the gear axis, in a direction parallel to the gear axis.

The invention will now be described by way of example with reference to the accompanying drawings in which:-

DESCRIPTION OF THE INVENTION

The transmission system is principally designed for use in driving aircraft accessories and in particular an alternator. The alternator is driven from an aircraft main engine but is required to be rotated at constant speed. The transmission is therefore designed for variable input speed, but constant output speed. It is however, to be understood that transmission incorporating the invention as herein defined can be used in transmission of this sort with other operating characteristics including constant input and variable output speed and variable input as well as output speeds.

Figure 1:
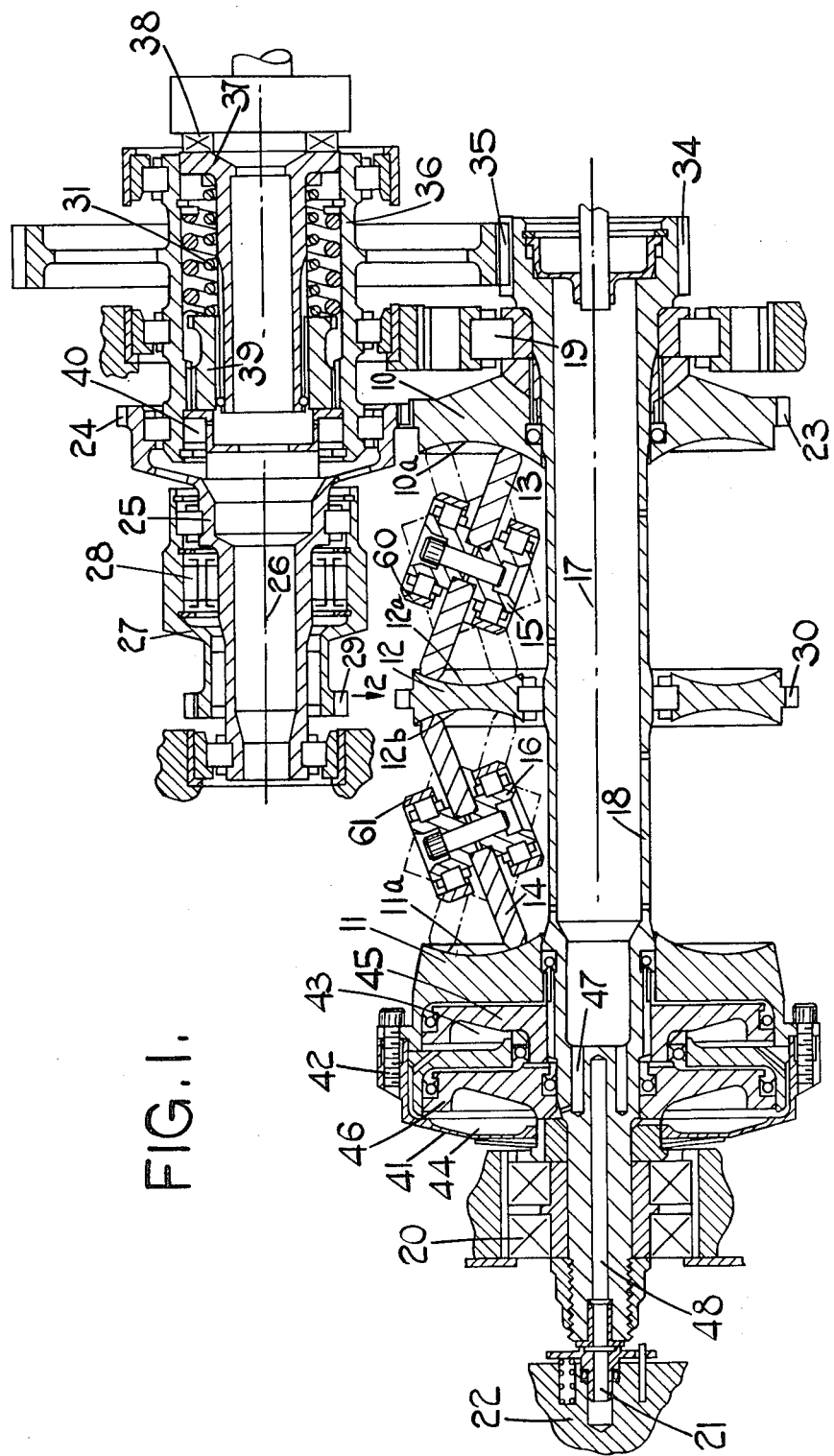
FIG. 1 is a cross-sectional view showing a transmission system constructed in accordance with the invention.

Referring first to FIG. 1, the general layout of the transmission is illustrated. The system includes a variable ratio drive unit having three rotors 10, 11, 12 which have respective part toroidal surfaces 10a, 11a, and 12a and 12b respectively. The rotor 12, is situated mid-way between the rotors 10 and 11, and is provided with its part toroidal surfaces 12a, 12b, on opposite axially presented sides thereof. The rotor 10 has its part toroidal surface 10a presented towards the surface 12a, and similarly the surface 11a of the rotor 11 is presented towards the surface 12b of the central rotor 12. The rotors 10, 11 are input rotors and the rotor 12 is an output rotor. However, the system will operate perfectly satisfactorily with the rotors 10, 11 as output and the input is the rotor 12. Situated between the rotors 10, 12 and 11, 12 are respective sets of flat rollers 13, 14. These are rotatable in a manner which will be described and are for this purpose carried in respective bearings 15, 16. The rollers are shown in FIG. 1 in positions in which they engage the respective surfaces 10a, 12a, and 11a, 12b, at different distances from the axis of rotation of the rotors 10, 11, 12. Such axis is identified at 17. The rotors 10, 11, are carried non-rotatably upon a hollow shaft 18. This is supported on suitable fixed structure 22 by means of bearings 19, 20 situated near its opposite ends respectively.

The input rotor 10 has on its external periphery, gear teeth 23, engaging with a gear ring 24, on a hollow stepped shaft 25. This hollow stepped shaft is mounted for rotation about an axis 26, parallel with the axis 17. Connecting the hollow stepped shaft 25, with a surrounding sleeve 27, is a clutch 28. The sleeve 27, has gear teeth 29, meshing with a gear (not shown) which drives auxiliary equipment which forms no part of this invention.

The output rotor 12 has external gear teeth 30 and this represents the output of the drive unit.

Driving the shaft 18, through gear teeth 34, thereon is a gear wheel 35, which is carried on a further hollow sleeve 36. Between the sleeve 36, and an input shaft 37, with, at one end, dogs 38, is a coupling incorporating an intermediate slidable sleeve 39, and an element 40, which is arranged to melt and allow the sleeve 39 and hence the shaft 37 to move under the influence of springs 31 in the event of this part of the system reaching a temperature in excess of a predetermined value, to disconnect the input drive from the system. This forms the subject of co-pending British Patent Application No. 33909/76.

To load the rotors 10, 11, 12, and the rollers 13, 14 so as to maintain frictional contact between them, there is an end load device within a housing 41, secured by screws 42, to the rotor 11, at the side thereof remote from its part toroidal surface 11a. Defined within the space between the rotor 11, and the housing 41, are cavities 43, 44, for hydraulic fluid. Within the cavities are respective pistons 45, 46, mounted on the shaft 18. In the end of the shaft 18 is a rotary fluid joint 21 engaged in the fixed structure 22. Furthermore in this end of the shaft 18, are drillings 47, 48 for supply and exhaust of fluid to the cavities 43, 44. The passage 48 communicates with the joint 21 for supplying high pressure fluid fed at one side of each of the pistons 45 and 46. At the other side of the pistons 45 and 46 lower fluid pressure is fed from one of the two drillings 47 which are symmetrical for balance of the shaft. This end load device is the subject of co-pending British/Patent Application No. 33906/76.

Figure 2:
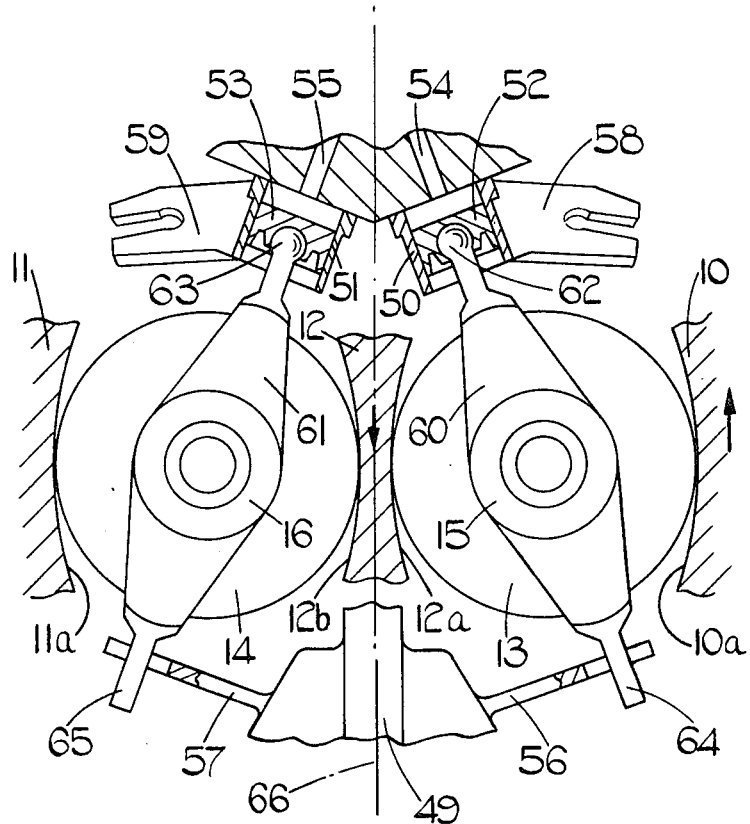
FIG. 2 is an enlarged view of the rotors and rollers as seen in the direction of the arrow 2 in FIG. 1 and partly in cross-section.

FIG. 2, shows, on an enlarged scale, portions of the rotors 10, 11 and 12, and their respective surfaces 10a, 11a, 12a, and 12b. Also illustrated are two rollers 13 and 14. It is, however, to be understood that there are, in this example, three sets of the rollers 13, 14, each roller arranged as will be described and in each set being equally spaced apart by 120 degrees.

The bearings 15, 16 are carried in bearing structures 60, 61 which are mounted in a portion 49 of the fixed structure 22 of the system. In FIG. 2 is shown one pair of rollers controlled by respective control cylinders 50, 51 mounted in the portion 49. Each control cylinder contains a piston 52, 53 and has hydraulic supply passages indicated generally at 54, and 55, in the portion 49. The hydraulic supply is the same as that in the rotary joint 21 leading to the end loading device adjacent to the rotor 11.

The portion 49, also carries forked arms, two pairs of which are indicated in the drawing identified by numerals 56, 57, 58 and 59. The forked arms 56, 57 are associated with the control cylinders 50 and 51 respectively to control the rollers 13 and 14 respectively, as will be described. The forked arms 58 and 59 however, are each associated with another pair of the rollers (which are not illustrated).

The roller bearings 15, 16 are as previously described, mounted in bearing supports 60, 61 respectively. One end of each support structure 60, 61 is provided with a spherical end 62, 63, engaging in the piston 52, 53 respectively to provide articulated joints. The other end of each support 60, 61 has a cylindrical spigot 64, 65 extending lengthwise of the bearing support and engaging in the fork of the forked arm 56, 57 respectively.

In operation of this transmission system, with variable speed input the system automatically compensates for input speed change, this being achieved through the alteration in the ration angle of the rollers to provide constant speed at the output. The inclination of the rollers as seen in FIG. 1, regulates the ratio of the speed of the input rotors 10, 11 to the speed of the output rotor 12. As illustrated in full lines, rotation of the input rotors 10, 11 at a given speed will cause rotation of the output rotor 12, at a slower speed than said given speed. As indicated in dotted lines the opposite ratio characteristic can be achieved if the point of contact between the rollers on the input rotors 10, 11 is outside that on the surfaces 12a, 12b of the output rotor 12, If, however, the rollers engage the surfaces 10a, 11a, 12a and 12b at the same radial distance on each surface from the axis 17 of the shaft 18, the input and output rollers 10, 11, 12 will all rotate at the same speed. This represents a drive ratio of 1:1 between the input and the output of the system.

It is, however, necessary for stable running that the axis of each of the rollers 13, 14 must intersect the gear axis 17 which is the axis of the shaft 18. To change the ratio the rollers are moved tangentially and they will then steer to new ratio angle positions in which they are again stable, that is where they intersect with the gear axis as specified above. To achieve the ratio change the control cylinders 50, 51, containing their pistons 52, 53 are actuated. These are shown in FIG. 2 to be arranged to move the bearing supports 60, 61 in general directions which are non-parallel or inclined at acute angles with respect to a plane indicated at 66, which is perpendicular to the gear axis 17, the latter being the axis of rotation of the shaft 18, and of the rotors 10, 11, 12. The inclination of the axes of the pistons and cylinders 52, 50, and 53, 51 are opposite to one another in each adjacent pair, as indicated in FIG. 2. Actuation of these pistons and control cylinders therefore move the axes of the rollers 13, 14, in directions which are substantially tangential with respect to the points of contact of the rollers, with respective part toroidal surfaces 10a, 11a, 12a and 12b. Such generally tangential movement of the rollers is accompanied by steering of the rollers about the centres of the spherical ends 62, 63 in order that the rollers may take up positions in which their rotational axes again intersect with the axis 17. It is, however, necessary to provide for change in the positions of the roller axes in a direction lengthwise of the axis 17, and this is accomplished by movement of the spigots 64, 65 in the forked arms 56, 57 respectively. The spigots 64, 65 are furthermore of cylindrical form so that, with the spherical ends, they permit angular movement of the bearing supports 60, 61 with respect to said arms. In making such provision for movement of the bearing supports in direction lengthwise of the axis 17, the inclination of the bearing supports with respect to the plane 66 changes. This inclination is the caster angle and consequently the caster angle will change as the ratio of speeds between the input and output rotors changes.

Preferably, the higher the rotational speed induced in the output rotor 12, the greater the caster angle should be, for improved stability in the system at high rotational speeds. which may be of the order of 20,000 revolutions per minute.

Figure 3:
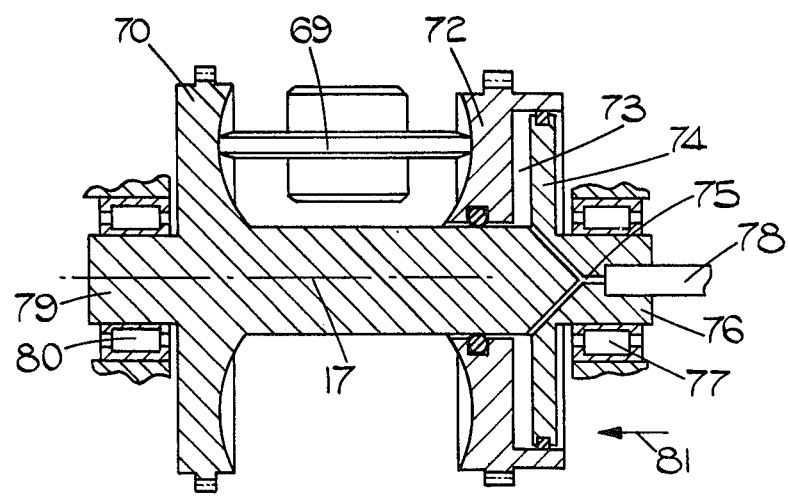
FIG. 3 is a fragmentary and diagrammatic view of an alternative construction.

In an alternative example shown in FIG. 3, the forked arms do not provide for sliding movement of the spigots so that the positions of the roller axes do not change axially with respect to the shaft axis 17. In such cases it it necessary to provide for axial sliding movement of rotors 70, 72, that is at least one of the input rotors 70 or output rotor 72. Such movement occurs in a direction lengthwise of the axis 17, about which these rotors rotate. End loading of the rotor 72 is provided by applying hydraulic fluid in a chamber 73 behind that rotor 72, to react against a plate 74. Hydraulic fluid enters this chamber through a passage 75 in a hub 76 mounted in a bearing 77. The passage 75 has a wider end in which the end of a fixed pipe 78 is slidably engaged. The rotor 70 has a hub 79 mounted in a bearing 80. The bearings 77,80 are concentric. The whole assembly of the rotors 70, 72, plate 74, rollers 69 is movable axially so that the varying distance between the rotors, as the rollers are adjusted can be accommodated, as indicated by the arrow 81.

Figure 4:
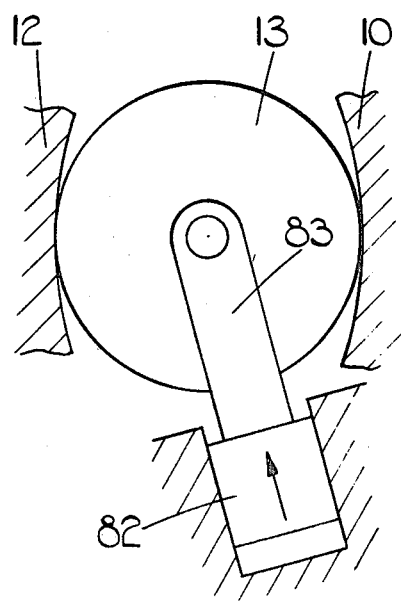
FIG. 4 is a fragmentary view of a further alternative form.

In another form shown in FIG. 4, the bearing supports are supported only at their ends at which the pistons are provided, the spherical ends 62. 63 being substituted by cylindrical end 82. With this arrangement the bearing support 83 can move only about an axis lengthwise and co-planar with the piston axis. Again the rotors are arranged to move axially.

What is claimed is:

1. A variable ratio frictional drive gear comprising two axially spaced rotatable torus discs rotatable about a common axis, part toroidal surfaces on the respective axially presented faces of said discs respectively, an input connected to one of said discs, an output connected to the other of said discs, a set of circumferentially spaced drive rollers in frictional rolling contact with the part toroidal surfaces on said discs respectively, bearing structures on which said rollers are mounted respectively, each of the bearing structures being tiltable through a ratio angle with respect to the plane of the rollers when the rollers are parallel to said common axis to vary the distances from the common axis of the discs at which the rollers engage the two torodial surfaces of the discs respectively, means for moving the roller bearing structures tangentially with respect to said axis of the discs by appling a force to said bearing structures, said force being in a direction which is non-parallel with respect to a plane perpendicular to the common axis of the discs and means for accomodating effective movement of the roller bearing structures relatively to said common axis of the discs, in a direction parallel to the common axis of the discs.

2. A transmission system as claimed in claim 1 wherein the means for moving each of the roller bearing structures generally tangentially is a respective piston and cylinder unit connected to the bearing structure through an articulated joint.

3. A transmission system as claimed in claim 2 in which the articulated joint is a spherical bearing and socket.

4. A transmission system as claimed in claim 3 in which the means for accommodating the effective movement of each of the roller bearing structures relatively to the gear axis of the discs is a pin and elongated slot connection between the bearing structure and a support therefor.

5. A transmission system as claimed in claim 4 in which the bearing structure carries a cylindrical pin engaging in a slot in the support.

6. A transmission system as claimed in claim 1 in which the means for accommodating the effective movement of the roller bearing structures relatively to the axis of the discs comprises means for providing sliding movement at least of the disc connected to the output.

* * * * *

UNITED STATES PATENT AND TRADEMARK OFFICE
CERTIFICATE OF CORRECTION

PATENT NO. : 4,281,559
DATED : August 4, 1981
INVENTOR(S) : RAYMOND SHARPE

It is certified that error appears in the above—identified patent and that said Letters Patent is hereby corrected as shown below:

Column 6, claim 1, line 10, after "discs" insert --to the points--.

Column 6, line 31, delete "gear".

Signed and Sealed this

Twenty-third Day of March 1982

[SEAL]

Attest:

GERALD J. MOSSINGHOFF

Attesting Officer

Commissioner of Patents and Trademarks